United States Patent
Oh et al.

(10) Patent No.: US 9,351,305 B2
(45) Date of Patent: May 24, 2016

(54) RESOURCE ALLOCATION METHOD AND APPARATUS OF HETEROGENEOUS CELLULAR COMMUNICATION SYSTEM

(75) Inventors: Dong Chan Oh, Seongnam-si (KR); Yong Hwan Lee, Seoul (KR)

(73) Assignees: Samsung Electronics Co., Ltd., Suwon-si (KR); Industry-Academic Cooperation Foundation, Seoul University, Seoul (KR)

( * ) Notice: Subject to any disclaimer, the term of this patent is extended or adjusted under 35 U.S.C. 154(b) by 844 days.

(21) Appl. No.: 13/362,209

(22) Filed: Jan. 31, 2012

(65) Prior Publication Data

US 2013/0003666 A1 Jan. 3, 2013

(30) Foreign Application Priority Data

Jul. 1, 2011 (KR) .......................... 10-2011-0065359

(51) Int. Cl.
*H04W 72/08* (2009.01)
*H04W 16/16* (2009.01)

(52) U.S. Cl.
CPC ............ *H04W 72/082* (2013.01); *H04W 16/16* (2013.01)

(58) Field of Classification Search
None
See application file for complete search history.

(56) References Cited

U.S. PATENT DOCUMENTS

| | | | | |
|---|---|---|---|---|
| 2009/0221295 A1* | 9/2009 | Sahin et al. | | 455/450 |
| 2010/0111022 A1* | 5/2010 | Chang et al. | | 370/329 |
| 2011/0080893 A1* | 4/2011 | Fong et al. | | 370/331 |
| 2011/0116480 A1* | 5/2011 | Li et al. | | 370/332 |
| 2012/0071190 A1* | 3/2012 | Choi et al. | | 455/517 |

* cited by examiner

*Primary Examiner* — Christine Duong
(74) *Attorney, Agent, or Firm* — Jefferson IP Law, LLP

(57) ABSTRACT

A resource allocation method and an apparatus for mitigating inter-cell interference in the heterogeneous cellular communication system are provided. The method for a first type base station to allocate resource in a wireless communication system including the first and second types base stations according to the present invention includes estimating an available Frequency Assignment (FA) not used by a neighbor second type terminal among FAs used by the first type base station, and allocating sub-channels associated with one of the available FAs not used by the neighbor second type terminal to a first type terminal, wherein the second type base station allocates the sub-channels for uplink and downlink transmissions of the second type terminal over a predetermined time period such that an FA in which sub-channels for the uplink transmissions are allocated and the FA in which sub-channels for the downlink transmissions are allocated are the same.

11 Claims, 6 Drawing Sheets

RESOURCE ALLOCATION METHOD AND APPARATUS OF HETEROGENEOUS CELLULAR COMMUNICATION SYSTEM

PRIORITY

This application claims the benefit under 35 U.S.C. §119(a) of a Korean patent application filed on Jul. 1, 2011 in the Korean Intellectual Property Office and assigned Serial No. 10-2011-0065359, the entire disclosure of which is hereby incorporated by reference.

BACKGROUND OF THE INVENTION

1. Field of the Invention

The present invention relates to a heterogeneous cellular communication system. More particularly, the present invention relates to a resource allocation method and apparatus for mitigating inter-cell interference in the heterogeneous cellular communication system.

2. Description of the Related Art

In order to improve performance of and to meet user requirements for a high speed data communication service, recent wireless communication systems have to secure a better radio environment. For example, a radio environment may be improved by removing an indoor shadow area, and utilizing limited frequency resources efficiently. Recently, there has been research on the use of a femto cell (e.g., a femto base station) for facilitating high speed data transmission service.

A femto cell is an indoor base station operating at low power and having relatively small cell size. For example, a femto cell may be approximately 10~50 m. Due to the femto cell's short coverage, it is advantageous to use the femto cell to improve the indoor communication service quality. However, deployment of a plurality of femto cells in a macro cell can cause several technical problems due to differences in the cell structures of femto cells and macro cells. One of the significant problems is inter-cell interference between heterogeneous cells (i.e. interference between the macro cell and the femto cell).

One of the simplest methods to address the inter-cell interference problem between heterogeneous cells is to separate the given frequency resource into dedicated channels. In this method, a part of the entire frequency resource is reserved for the macro cell, and the remaining frequency resource is allocated to femto cells. This method is advantageous for mitigating interference because of its simplicity. However, because a specific frequency resource can be used for only one of a macro cell and a femto cell, resource utilization efficiency is reduced. In order to address the low resource utilization efficiency problem of this method, research is being conducted on a technique that enables a macro cell and a femto cell to use the same frequency resource (e.g., a co-channel) while mitigating inter-cell interference.

There are many techniques known to mitigate inter-cell interference. One technique that is known to mitigate inter-cell interference is a modified frequency reuse method. The modified frequency reuse method adopts a macro cell structure with Fractional Frequency Reuse (FFR). In this method, the femto cell is assigned, according to its location, an orthogonal Frequency Assignment (FA) resource which is not used by the macro cell, thereby mitigating inter-cell interference between heterogeneous cells. However, because the available FA resource is fixed according to the location of the femto cell, the frequency reuse rate of the femto cell is very low.

Another related approach to mitigate inter-cell interference is to allocate a sub-channel causing the least interference with the femto user terminal (e.g., the femto terminal) based on the downlink interference information provided by the macro cell. However, this method is designed to maximize the performance of the femto user terminal without consideration of the interference of the femto cell to an adjacent macro user terminal. Accordingly, if a macro user terminal is located in an indoor region or a macro cell boundary region at which the macrocell signal is weak, then the adjacent femtocell may not be able to detect the signal from the macrocell and, as a consequence, the femto cell may erroneously determine (e.g., mis-detect) that the sub-channel preoccupied by the macro cell is not being used. If the femtocell uses the sub-channel preoccupied by the macro cell, then the sub-channel signal of the femto cell may significantly interfere with the adjacent macro user. Further, if the transmission power of signals transmitted across the sub-channel in the femto cell are increased to maximize the femto cell's performance, then the interference caused by the sub-channel signal of the femto cell may be increased. For example, the interference may extend to the neighbor femto user terminals as well as neighbor macro user terminals.

Therefore, a need exists for a method and apparatus for adjusting the transmission power below an appropriate level in accordance with the channel environment.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and or/disadvantages and to provide at least the advantages described below. Accordingly, an aspect of the present invention is to provide a resource allocation method and apparatus that is capable of maximizing the channel capacity of the heterogeneous cellular communication system while suppressing interference to the user terminals in neighbor macrocell.

In accordance with an aspect of the present invention, a method for a first type base station to allocate resource in a wireless communication system including the first and second types base stations is provided. The method includes estimating an available Frequency Assignment (FA) not used by a neighbor second type terminal among FAs used by the first type base station, and allocating sub-channels associated with one of the available FAs not used by the neighbor second type terminal to a first type terminal, wherein the second type base station allocates the sub-channels for uplink and downlink transmissions of the second type terminal over a predetermined time period such that an FA in which sub-channels for the uplink transmissions are allocated and the FA in which sub-channels for the downlink transmissions are the same.

In accordance with another aspect of the present invention, a first type base station for allocating resource in a heterogeneous cellular radio communication system including first and second types base stations is provided. The first type base station includes a Frequency Assignment (FA) determiner which estimates an available FA not used by a neighbor second type terminal among FAs used by the first type base station, and a sub-channel allocator which allocates sub-channels associated with one of the available FAs not used by the neighbor second type terminal to a first type terminal, wherein the second type base station allocates the sub-channels for uplink and downlink transmissions of the second type terminal over a predetermined time period such that an FA in which sub-channels for the uplink transmissions are allocated and the FA in which sub-channels for the downlink transmissions are allocated are the same.

In accordance with another aspect of the present invention, a non-transitory computer readable-storage medium of a first type base station is provided. The non-transitory computer-readable storage medium stores a program for allocating resources in a wireless communication system including the first and second types base stations. The program includes instructions to cause a computer to estimate an available Frequency Assignment (FA) not used by a neighbor second type terminal among FAs used by the first type base station, and allocate sub-channels associated with one of the available FAs not used by the neighbor second type terminal to a first type terminal, wherein the second type base station allocates the sub-channels for uplink and downlink transmissions of the neighbor second type terminal over a predetermined time period such that an FA in which sub-channels for the uplink transmissions are allocated and the FA in which sub-channels for the downlink transmissions are allocated are the same.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
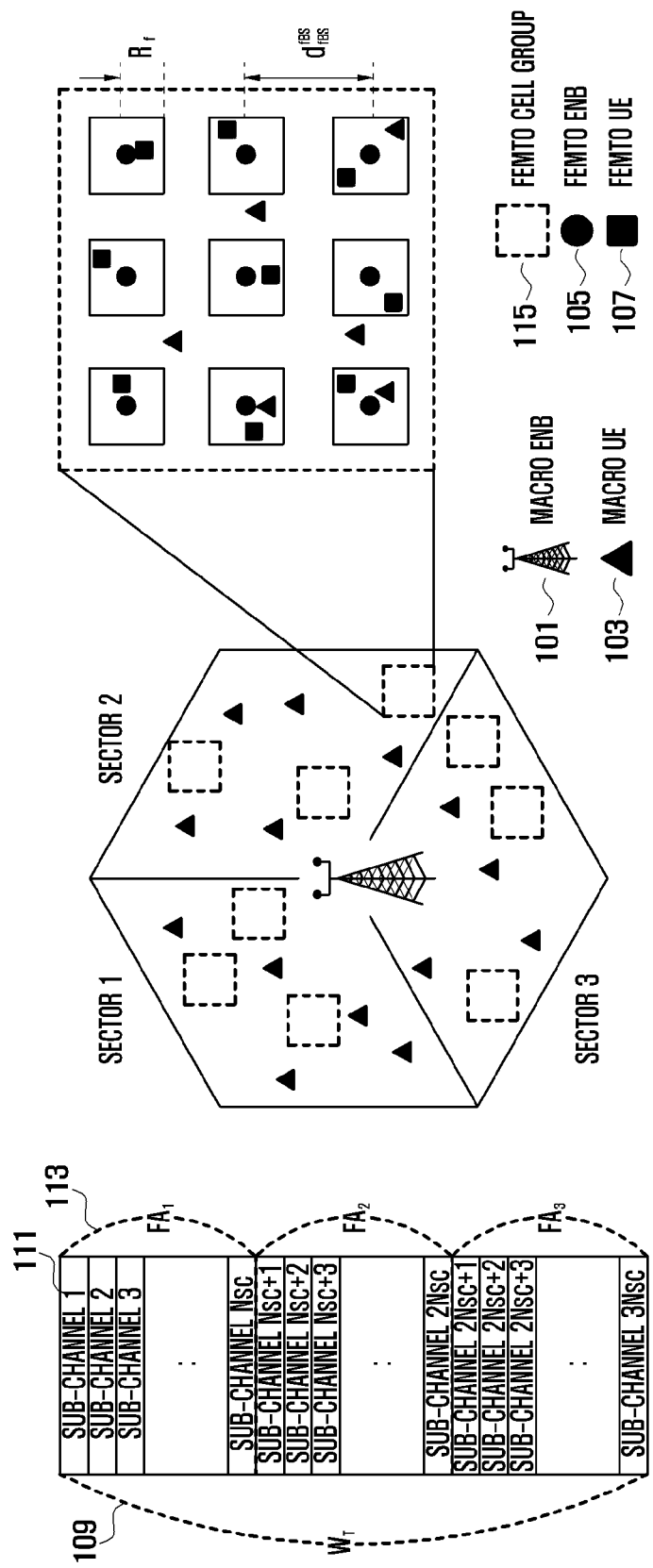
FIG. 1 is a diagram illustrating a heterogeneous cellular communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the similar reason, some elements may be exaggerated, omitted, or simplified in the drawings, and the elements may have sizes and/or shapes different from those shown in drawings, in practice. The same reference numbers are used throughout the drawings to refer to the same or like parts.

A description is made of a resource allocation method and apparatus according to exemplary embodiments of the present invention with reference to the accompanying drawings.

FIG. 1 is a diagram illustrating a heterogeneous cellular communication system according to an exemplary embodiment of the present invention. Although the description is directed to a system model depicted in FIG. 1, exemplary embodiments of the present invention also can be applied to other types of heterogeneous cellular system.

Referring to FIG. 1, the heterogeneous cellular system includes a macro evolved Node B (eNB) 101, a plurality of macro User Equipments (UEs) 103, a femto eNB 105, and a plurality of femto UEs 107. Although the description is directed to the system comprising macro eNBs, macro UEs, femto eNBs, and femto UEs, exemplary embodiments of the present invention can be applied to other heterogeneous cellular systems without departing from the scope of the present invention.

In the following description, the term 'user' denotes 'UE' or 'terminal'. That is, a macro user means a macro UE or a macro terminal, and a femto user means a femto UE or a femto terminal.

The entire channel bandwidth $W_T$ 109 comprises N Frequency Assignments (FAs). Each FA 113 comprises $N_{SC}$ Sub-Channels (SCs) 111. The macro eNB 101 uses the entire channel bandwidth $W_T$ 109. The macro eNB 101 assigns the sub-channels 111 to the macro UEs 103. For example, the macro eNB 101 may allocate the sub-channels 111 to a macro UE 103 having the best channel state so as to maximize multiuser gain. As an example, 9 femto cells, each having a diameter of $R_f$, may be grouped so as to form a femto cell group 115 in the form of 3×3 square structure. For purposes of describing exemplary embodiments of the present invention, it is assumed that the femto cell groups 115 are distributed uniformly within a macrocell. The femto eNB 105 selects one of the FAs as a utilization FA and assigns floor ($\rho f N_{SC}$) (0≤$\rho f$≤1) sub-channels to the femto cells 107. Floor(x) is a function returning an integer equal to or less than x.

It is assumed that the macro UE 103 is located in the range of interference of a femto cell (e.g., within or around the femto cell). In this case, the macro UE 103 determines whether the macro UE 103 is located in the interference area of the femto cell by analyzing a unique signal (e.g., a preamble) of the femto eNB 105. If the macro UE 103 and the femto eNB 105 use different FAs 113, then no interference takes place between the macro UE 103 and the femto eNB 105. However, if the macro UE 103 and the femto eNB 105 use the same FA 113, then the macro UE 103 is influenced by interference from the femto eNB 105.

Figure 2:
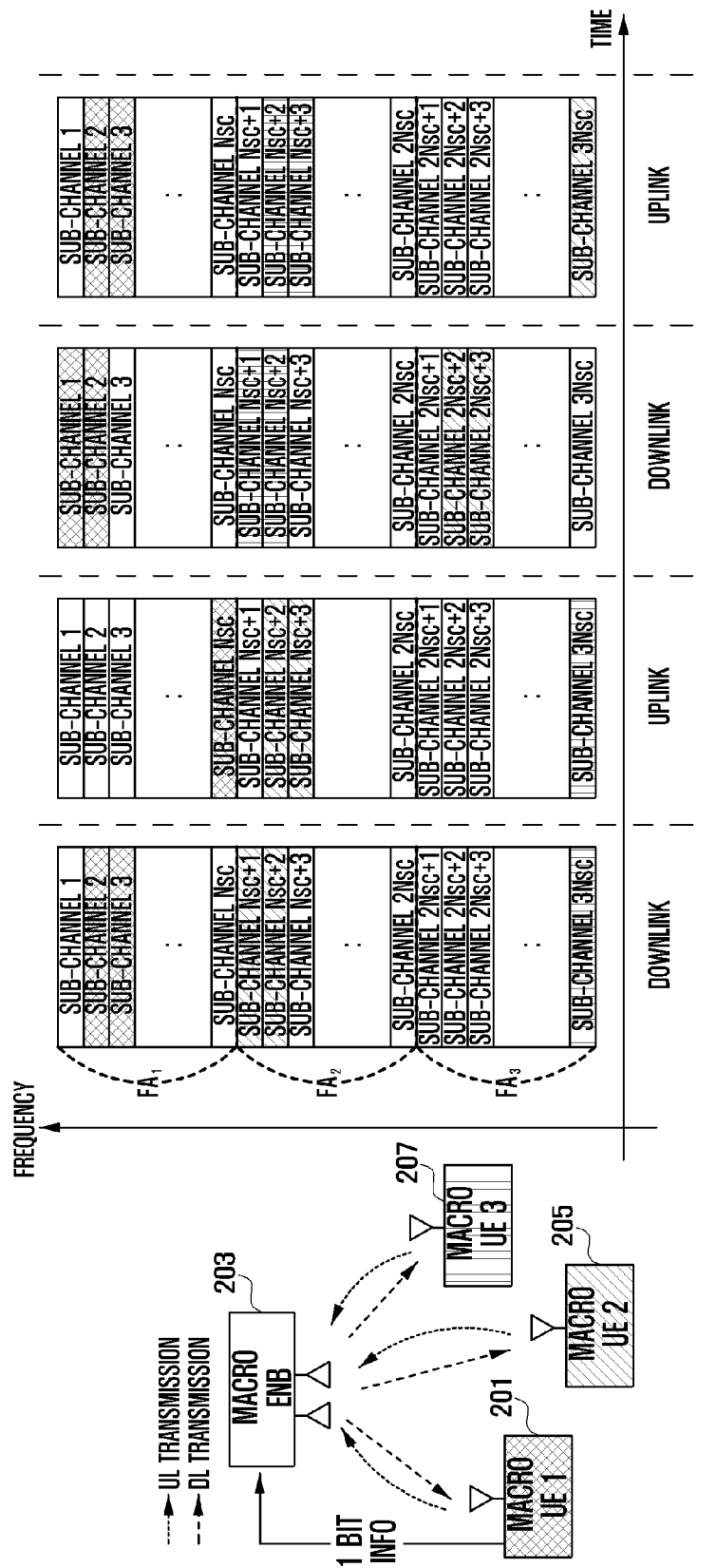
FIG. 2 is a diagram illustrating a sub-channel allocation principle of a macrocell in a resource allocation method according to an exemplary embodiment of the present invention.

FIG. 2 is a diagram illustrating a sub-channel allocation principle of a macrocell in a resource allocation method according to an exemplary embodiment of the present invention.

The macro eNB 203 assumes that the macro UE 1 201 is located at a femto cell interference area. The macro UE 1 201 located at the femto cell interference area sends the macro eNB 203 information (e.g., at least 1 bit) indicating that it is located at the femto cell interference area. Until the macro UE 1 201 escapes (e.g., moves out of) the femto cell interference area, the macro eNB 203 allocates the sub-channel for uplink/downlink signal transmission in the same FA. Assuming that the macro UE 1 201 is located at the femto cell interference area among the macro UEs 201, 205, and 207 as shown in FIG. 2, the macro eNB 203 allocates the sub-channel such that the uplink/downlink signal transmission is maintained over a predetermined time period in FA1. The time period can be a relatively long duration (e.g. 1 minute or 15 seconds). According to another exemplary embodiment of the present invention, when the macro UE 201 has escaped from (e.g., moved out of) the femto cell interference area, the macro UE 1 201 sends the macro eNB 203 information (e.g., at least 1 bit) indicating that the macro UE 201 has escaped from the femto cell interference area. Upon receipt of this information, the macro eNB 203 allocates sub-channels limitlessly to the macro UE 1 201 in the FA1 to maintain uplink/downlink signal transmission.

If the uplink/downlink signal transmission of the macro UE is maintained over a predetermined period in the same FA, then it is possible to estimate the FA of the downlink signal of the corresponding macro UE by referencing the uplink signal of the macro UE.

According to another exemplary embodiment of the present invention, rather than having the macro UE 201 transmit to the macro eNB 203 the information (e.g., at least 1 bit) relating to the UE 201 escaping (e.g., moving away from) the femto cell interference area, the macro eNB 203 may allocate sub-channels such that macro UEs served by the macro eNB 203 perform uplink/downlink signal transmissions in the same FA. That is, the macro eNB can allocate resources such that the macro UE 1 201 maintains its uplink/downlink signal transmission in FA1, the macro UE 2 205 maintains its uplink/downlink signal transmission in FA2, and the macro UE 3 207 maintains its uplink/downlink signal transmission in FA3.

According to still another exemplary embodiment of the present invention, the macro eNB 203 may detect that the macro UE 201 has escaped from the femto cell interference area using a different method without receiving explicit information from the macro UE 201 indicating that it has escaped from the femto cell interference area.

Figure 3:
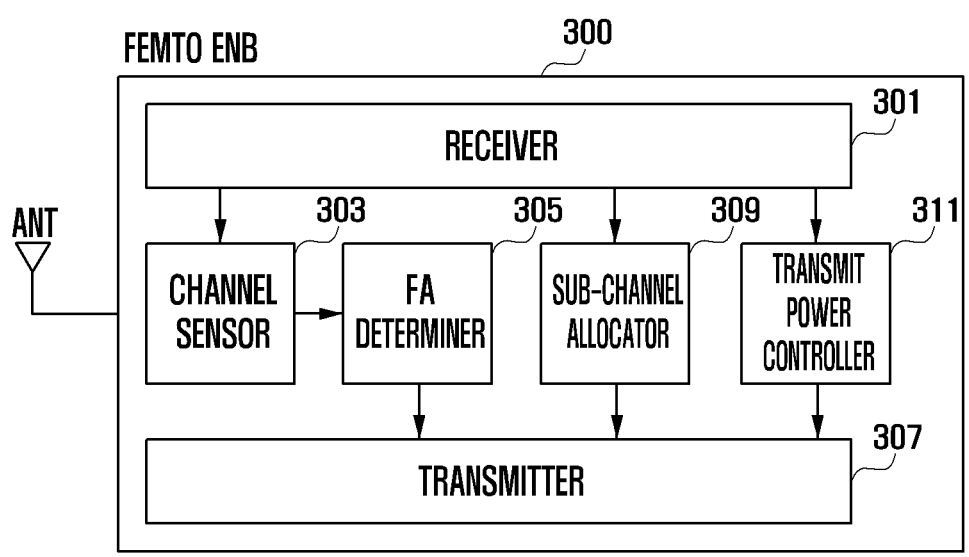
FIG. 3 is a block diagram illustrating a configuration of a femto evolved Node B (eNB) according to an exemplary embodiment of the present invention.

FIG. 3 is a block diagram illustrating a configuration of a femto eNB according to an exemplary embodiment of the present invention.

Referring to FIG. 3, the femto eNB 300 includes a receiver 301, a channel sensor 303, an FA determiner 305, a transmitter 307, a sub-channel allocator 309, and a transmit power controller 311. The receiver 301 transfers the samples received in uplink signal transmission period to the channel sensor 303. The channel sensor 303 detects the sub-channel used by neighbor macro UE using the sample received in the uplink signal transmission period. For example, when the channel sensor 303 performs channel sensing by means of an energy detector or the like, the received signal $R_n$ of the femto eNB corresponding to the sub-channel n can be expressed by Equation 1:

$$R_n = \begin{cases} V_n, & J_0 \\ H_n S_n + V_n, & J_1. \end{cases} \quad (1)$$

In Equation 1, $J_0$ denotes a hypothesis corresponding to a signal not comprising a neighbor macro UE's signal. $J_1$ denotes a hypothesis corresponding to a signal comprising a neighbor macro UE's signal. $V_n$ denotes noise, $S_n$ denotes the neighbor macro UE's signal, and $H_n$ denotes the channel between the neighbor macro UE and the femto eNB. The channel sensor 303 derives a test statistic function $Y_n$ with $M_T$ received signal energy samples as shown in Equation 2:

$$Y_n = \frac{1}{M_T} \sum_{m=1}^{M_T} |R_n(m)|^2. \quad (2)$$

The channel sensor 303 compares the test statistic function with a threshold value as shown in Equation 3 and sends the sensing result associated with sub-channel n to the FA determiner 305.

$$u_n = \begin{cases} 1; & Y_n \geq \lambda \\ 0; & Y_n < \lambda. \end{cases} \quad (3)$$

The FA determiner 305 determines whether a specific sub-channel in a certain FA is used by the neighbor macro UE. For example, to determine whether a specific sub-channel in a certain FA is used by the neighbor macro UE, the FA determiner 305 may use the assumption that the uplink/downlink signal transmission of the neighbor macro UE is performed in an FA over a predetermined time period (e.g., as illustrated in FIG. 2), and may use the sensing result $u_n$ on the sub-channel n. The sensing result $u_n$ on the sub-channel n varies according to the uplink signal of the neighbor macro UE. As aforementioned, it is assumed that the uplink/downlink signal transmission of the macro UE is performed in an FA. Accordingly, the FA determiner 305 may determine whether the downlink signal of the neighbor macro UE is transmitted in use of the FA to which the sub-channel belongs, based on the sensing result $u_n$ of the sub-channel n.

If it is determined that at least one sub-channel of a certain FA is used by the neighbor macro UE, then the FA determiner 305 can avoid assigning or allocating access to the FA to which the sub-channel used by the neighbor macro UE belongs. That is, if it is determined that the neighbor macro UE uses at least one sub-channel in an FA, then the FA determiner excludes the FA including the sub-channel used by the UE from assignment. For example, in this method, the FA to be used is determined according to the neighbor UE detection result associated with each FA. The neighbor macro UE detection result $D_f$ per FA can be expressed by Equation 4.

$$D_f = \begin{cases} J_{1,FA_f}; & \sum_{n=1}^{N_{SC} \in FA_f} u_n \geq 1 \\ J_{0,FA_f}; & \text{otherwise} \end{cases} \quad (4)$$

where $J_{1,FA_f}$ denotes a hypothesis corresponding to a signal when an $FA_f$ (f=1, ..., NFA) is not used by the neighbor macro UE. $J_{0,FA_f}$ denotes a hypothesis corresponding to a signal when an $FA_f$ (f=1, ..., NFA) is used by the neighbor macro UE.

The FA determiner 305 can initialize the available FA set $FA_{op}$ determine an FA to be used as shown in Equation 5.

$$FA_{op} = \{\cdot\} \quad (5)$$

Next, the FA determiner 305 forms an available FA set so as to include FAs that are not used by the neighbor macro UE as elements as expressed by Equation 6.

$$FA_{op} = FA_{op} \cup FA_f \text{ if } D_f = J_{0,FA_f} \quad (6)$$

The FA determiner 305 selects an FA from the available FA set as the FA to be used. If there is one or more elements in the FA set (i.e. if there a plurality of FAs not used by the neighbor macro UE), then the FA determiner can determine the FA to be used with the above method.

However, if there is no element in the available FA set, this causes a problem. If there is no FA that is not used by the neighbor macro UE, then the FA determiner 305 determines the FA to be used to be the FA for which the sum of energies received through the sub-channels of $FA_f$ is the least. For example, the FA determiner 305 determines the FA to be used as expressed by Equation 7. The determiner 305 then sends the identity information of the selected FA to the transmitter 311.

$$FA_{op} = \underset{FA_f, f=1,\ldots,N_{FA}}{\operatorname{argmin}} \sum_{n=1}^{N_{SC} \in FA_f} Y_n \quad (7)$$

If a femto UE uses the FA determined by Equation 7, then it is expected that the interference to the neighbor macro UE approximate to the minimum value.

The transmitter 307 sends the identity information of the FA to be used by the femto UE to the femto UE. The femto UE sends the femto eNB 300 the information on the preference sub-channels in the FA that are selected according to the received FA information to be used. The receiver 301 receives the preference sub-channel identity information and forwards the information to the sub-channel allocator 309. The sub-channel allocator 309 sends the preference sub-channel identity information to the transmitter 307. The preference sub-channel identity information can include the floor($\rho f N_{SC}$) sub-channels. The transmit power controller 311 adjusts the transmit power level of the femto eNB using the femto eNB's required transmit power level information received from the femto UE, and sends the result to the to the transmitter 311. The transmitter 311 transmits signals to the femto UE, using the preference sub-channel identity information and the transmit power level information.

Figure 4:
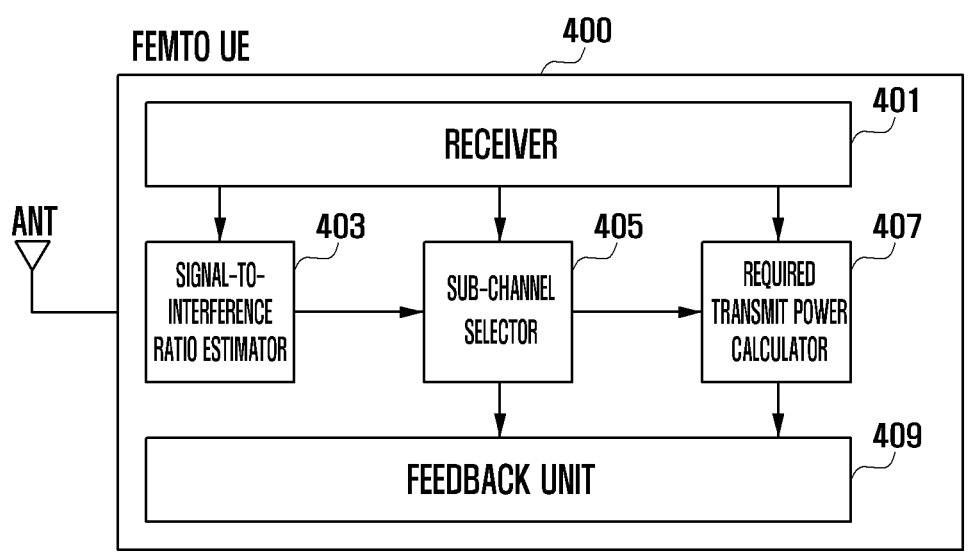
FIG. 4 is a block diagram illustrating a configuration of a femto User Equipment (UE) according to an exemplary embodiment of the present invention.

FIG. 4 is a block diagram illustrating a configuration of a femto UE according to an exemplary embodiment of the present invention. The femto UE 400 can feed back (transmit) the information on the preference sub-channels in the FA to be used and the required transmit power of the femto eNB.

Referring to FIG. 4, the femto UE 400 includes a receiver 401, a signal-to-interference ratio estimator 403, a sub-channel selector 405, a required transmit power calculator 407, and a feedback unit 409. The receiver 401 receives the selected FA information (i.e. the identity information on the FA to be used by the femto UE) from the femto eNB, and delivers the information to the signal-to-interference ratio estimator 403. The signal-to-interference calculator 403 calculates the signal-to-interference ratio $\phi_{n_{OP}}$ of the sub-channel in the FA to be used as expressed by Equation 8 and sends the signal-to-interference ratio $\phi_{n_{OP}}$ to the sub-channel selector 405.

$$\varphi_{n_{OP}} = \frac{\|h_{n_{OP}}\|^2}{I_{n_{OP}}}, n_{OP} \in FA_{op}. \quad (8)$$

In Equation 8, $n_{OP}$ denotes the sub-channel index in the FA to be used. $\|h_{n_{OP}}\|^2$ denotes the channel gain from the femto eNB on the sub-channel $n_{OP}$ of the FA to be used. $I_{n_{OP}}$ denotes the strength of interference on the sub-channel $n_{OP}$ in the selected FA. The sub-channel selector 405 selects floor ($\rho f N_{SC}$) preference sub-channels in the corresponding FA using the signal-to-interference ratio on the sub-channels $n_{OP}$ in the input FA. The sub-channel selector sends the identity information of the selected sub-channels (i.e. the preference sub-channel identity information) to the required transmit power calculator 407 and the feedback unit 409. For example, the sub-channel selector 405 can select floor($\rho f N_{SC}$) preference sub-channels having the highest signal-to-interference ratio as the preference sub-channels to maximize the channel capacity of the femto UE.

The required transmit power calculator 407 calculates minimum transmit power of the femto eNB. The femto eNB transmits signals to the femto UE through the sub-channel corresponding to the preference sub-channel identity information received by the required transmit power calculator 407. When the femto eNB transmits signals, the required transmit power calculator 407 calculates minimum transmit power to mitigate inter-cell interference to the neighbor femto cell using the same sub-channel. The minimum transmit power of each sub-channel which is allocated by the femto eNB 300 to let the signal-to-interference ratio of the femto cell become δ(dB) can be expressed by Equation 9:

$$P_{n_{OP}}(\text{dBm}) = \max\{\min(I_{n_{OP}} + \alpha + \delta, p_{max}), p_{min}\} \quad (9)$$

where α denotes the path loss between the femto UE and the femto eNB, and $p_{max}$ and $p_{min}$ denote the maximum and minimum transmit powers of the femto eNB, respectively.

The feedback unit 409 feeds back (e.g., transmits) the preference sub-channel identity information and the femto eNB's required transmit power to the femto eNB.

Figure 5:
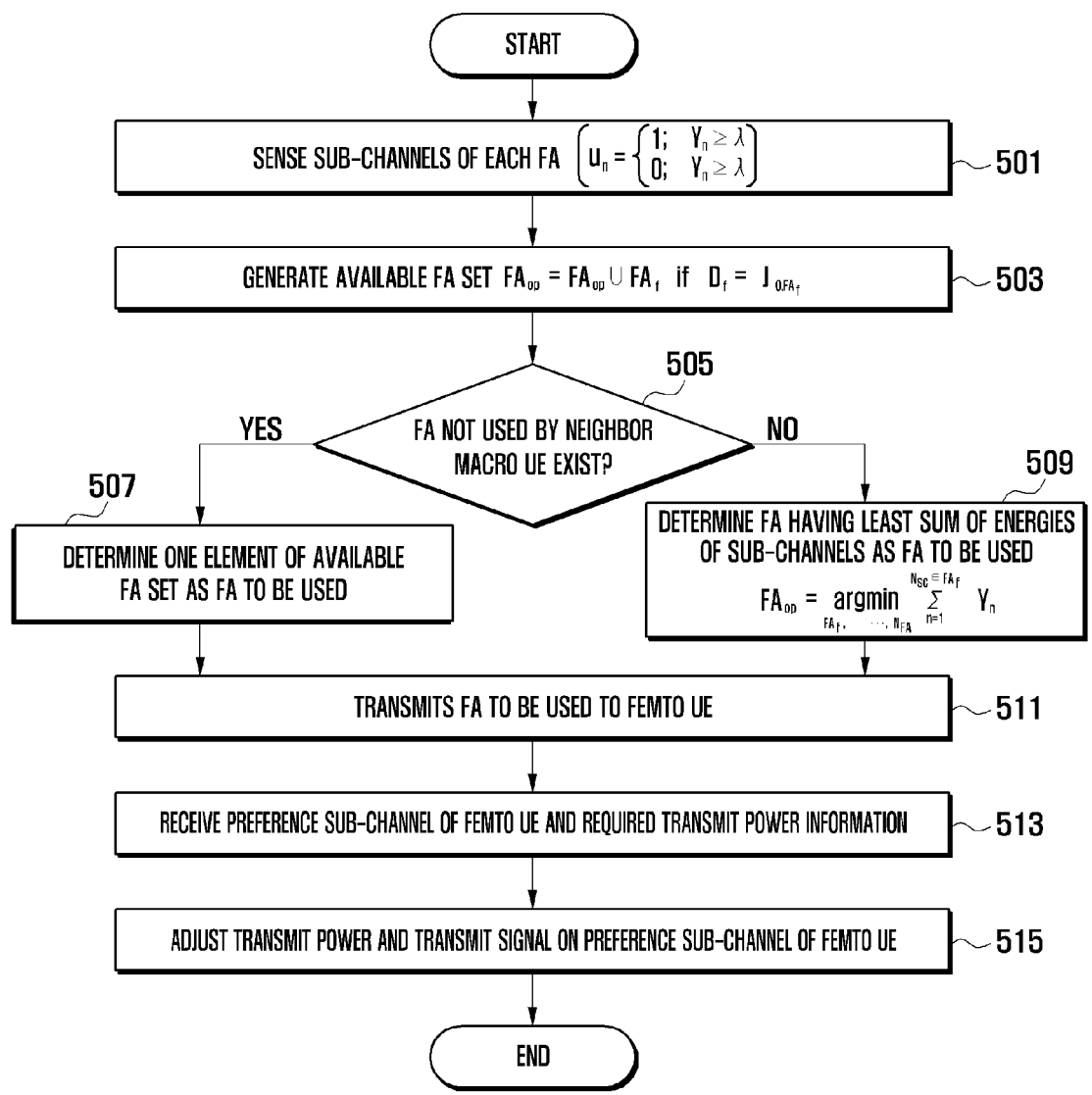
FIG. 5 is a flowchart illustrating a femto eNB procedure of a resource allocation method of the femto eNB according to an exemplary embodiment of the present invention.

FIG. 5 is a flowchart illustrating a femto eNB procedure of a resource allocation method of a femto eNB according to an exemplary embodiment of the present invention.

Referring to FIG. 5, the femto eNB 300 obtains the channel sensing result on the sub-channels in each FA according to the method described with reference to Equations 1 to 3 at step 501. Next, the femto eNB 300 generates an available FA set based on the channel sensing result on the sub-channels of each FA as described with reference to Equation 6 at step 503. Next, the femto eNB 300 determines whether there is an FA in the available FA set which is not used by the neighbor macro UE at step 505. If there is any FA which is not used by the neighbor macro UE, then the method proceeds to step 507.

Otherwise, if there is no FA which is not used by the neighbor macro UE, then the method proceeds to step 509.

If there is any FA which is not used by the neighbor macro UE, then the femto eNB 300 selects an FA from the available FA set as the FA to be used at step 507. Otherwise, if there is no FA which is not used by the neighbor macro UE, then the femto eNB 300 selects as the FA to be used the FA for which the sum of energies received through the sub-channels of $FA_f$ is least at step 509. For example, the femto eNB 300 selects as the FA to be used as described with reference to Equation 7.

At step 511, the femto eNB 300 sends the femto UE 400 the identity information of the FA to be used which has been selected at step 507 or 509. The femto eNB 300 receives the identity information of the FA to be used and the required transmit power information from the femto UE at step 513. For example, the method for acquiring the preference sub-channel identity information and the required transmit power information has been described with reference to FIG. 4. At step 515, the femto eNB 300 adjusts its transmit power based on the required transmit power and the preference sub-channel identity information received at step 513. The femto eNB 300 transmits signals to the femto UE 400 on the preference sub-channel selected in the FA at the adjusted transmit power.

Figure 6:
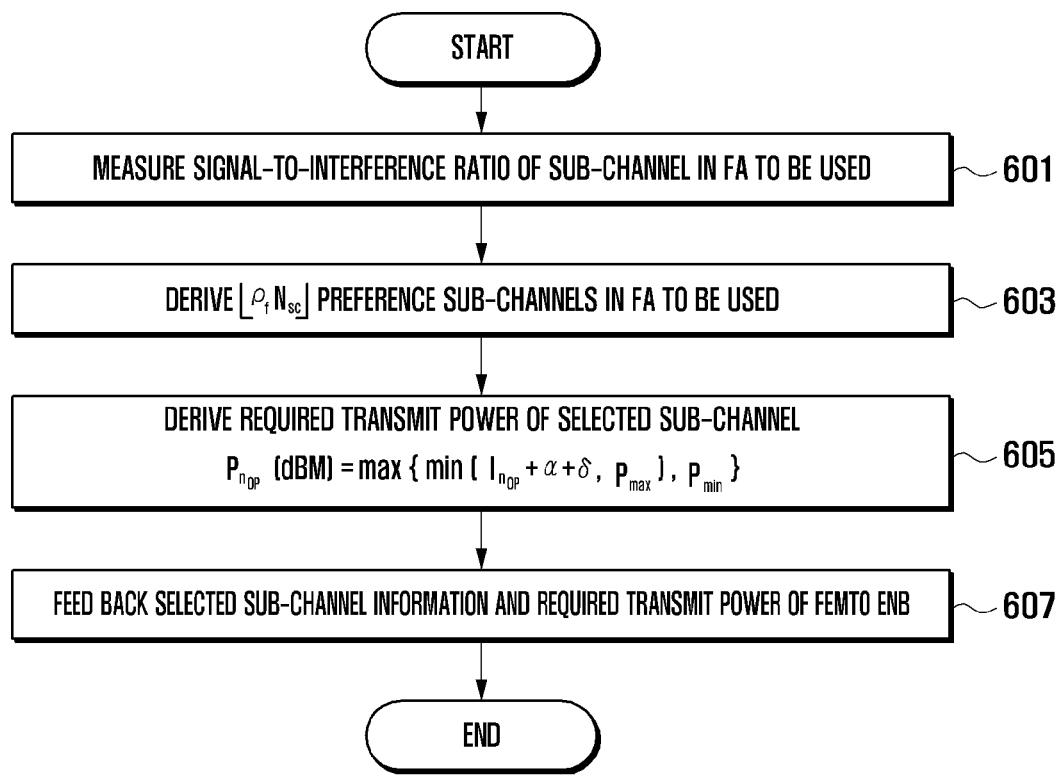
FIG. 6 is a flowchart illustrating a femto UE procedure of a resource allocation method according to an exemplary embodiment of the present invention.

FIG. 6 is a flowchart illustrating a femto UE procedure of the resource allocation method according to an exemplary embodiment of the present invention.

Referring to FIG. 6, the femto UE 400 measures signal-to-interference ratio on the sub-channels of an FA to be used as described with reference to Equation 8 at step 601. At step 603, the femto UE 400 derives floor($\rho f N_{SC}$) preference sub-channels based on the signal-to-interference ratio measured at step 601. Next, the femto UE 400 calculates the required transmit power of the preference sub-channels of the femto eNB 300 as described with reference to Equation 9 at step 605. Finally, the femto eNB 400 feeds back (e.g., transmits) information on the preference sub-channels and the femto eNB's required transmit power information to the femto eNB at step 607.

As described above, the resource allocation method according to exemplary embodiments of the present invention can be applied to a heterogeneous cellular radio communication system including a plurality of femtocells and macro cells. Although the description has been directed to a specific heterogeneous cellular radio system including femtocells and macro cells, the resource allocation method according to exemplary embodiments of the present invention can be applied to other types of heterogeneous cellular radio communication systems without departing from the scope of the present invention. For example, exemplary embodiments of the present invention may be applied to a heterogeneous cellular radio system including first type base stations (e.g., first type cells) having relatively small radio coverage and second type base stations (e.g., second type cells) having relatively large radio coverage. Exemplary embodiments of the present invention described herein include a first type base station corresponding to a femto eNB and a second type base station corresponding to a macro eNB.

As described above, the resource allocation method and apparatus according to exemplary embodiments of the present invention are advantageous in maximizing the channel capacity of a heterogeneous cellular radio system while preventing or otherwise reducing the interference experienced by neighbor macro eNB users.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the exemplary embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the invention and is not intended to be limiting. Because modifications of the disclosed exemplary embodiments incorporating the spirit and substance of the invention may occur to persons skilled in the art, the invention should be construed to include everything within the scope of the appended claims and equivalents thereof.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for a first type base station to allocate a resource in a wireless communication system including the first and second types base stations, the method comprising:

identifying a first frequency assignment (FA) allocated to a neighbor second type terminal based on an uplink transmission signal transmitted from the neighbor second type terminal to a second type base station;

determining an available FA based on the first FA, the available FA being not overlapped with the first FA;

allocating sub-channels associated with one of available FAs not used by the neighbor second type terminal to a first type terminal; and allocating, if there does not exist any available FA not used by the neighbor second type terminal, the sub-channels associated with an FA, for which a sum of energies of sub-channels is minimum, to the first type terminal, wherein a sub-channel for downlink transmissions of the neighbor second type terminal are allocated in the first FA in which a sub-channel for uplink transmissions of the neighbor second type terminal are allocated, to determine the available FA, if the neighbor second type terminal is located at the first type base station interference area.

2. The method of claim 1, wherein the determining of the available FA comprises:

sensing a signal of the neighbor second type terminal on the sub-channels associated with a frequency band used by the first type base station; and identifying the available FAs which is not used by the neighbor second type terminal based on the signal of the sensed neighbor second type terminal.

3. The method of claim 1, further comprising:

determining identity information of an FA selected among FAs not used by the neighbor second type terminal or FAs for which a sum of energies of sub-channels associated with the FA is minimum, as the FA to be used; and transmitting the identity information of the FA determined to be used to the first type terminal.

4. The method of claim 3, further comprising;

receiving the identity information and transmit power information of a preferred sub-channel among the sub-channels associated with the FA to be used from the first type terminal, wherein the allocating of the sub-channels comprises allocating the sub-channels to the first type terminal based on the identity information and transmit power information of the preferred sub-channel of the first type terminal.

5. The method of claim 1, wherein the first type terminal is a femto terminal, the first type base station is a femto base station, the neighbor second type terminal is a macro terminal, and the second type base station is a macro base station.

6. A first type base station for allocating a resource in a heterogeneous cellular radio communication system including first and second types base stations, the first type base station comprising:

a Frequency Assignment (FA) determiner which identifies a first FA allocated to a neighbor second type terminal based on an uplink transmission signal transmitted from the neighbor second type terminal to a second type base station, and determines an available FA based on the first FA, the available FA being not overlapped with the first FA; and a sub-channel allocator which allocates sub-channels associated with one of the available FAs not used by the neighbor second type terminal to a first type terminal, and allocates, if there does not exist any available FA not used by the neighbor second type terminal, the sub-channels associated with an FA, for which a sum of energies of sub-channels is minimum, to the first type terminal, wherein a sub-channel for downlink transmissions of the neighbor second type terminal are allocated in the first FA in which a sub-channel for uplink transmissions of the neighbor second type terminal are allocated, to determine the available FA, if the neighbor second type terminal is located at the first type base station interference area.

7. The first type base station of claim 6, further comprising:

a channel sensor which senses a signal of the neighbor second type terminal on the sub-channels associated with a frequency band used by the first type base station, wherein the FA determiner identifies the available FA which is not used by the neighbor second type terminal based on the signal of the sensed neighbor second type terminal.

8. The first type base station of claim 6, further comprising:

a transmitter which transmits the identity information of an FA determined to be used to the first type terminal, wherein the FA determiner determines identity information of the FA to be used which is selected among FAs not used by the neighbor second type terminal or FAs having a sum of energies of sub-channels belonged to the FA is minimum as the FA to be used.

9. The first type base station of claim 8, further comprising:

a receiver which receives the identity information and transmit power information of a preferred sub-channel among the sub-channels associated with the FA to be used from the first type terminal, wherein the sub-channel allocator allocates the sub-channels to the first type terminal based on the identity information and transmit power information of the preferred sub-channel of the first type terminal.

10. The first type base station of claim 6, wherein the first type terminal is a femto terminal, the first type base station is a femto base station, the neighbor second type terminal is a macro terminal, and the second type base station is a macro base station.

11. A non-transitory computer-readable storage medium of a first type base station storing a program for allocating resources in a wireless communication system including the first and second types base stations, the program comprising instructions to cause a computer to:

identify a first frequency assignment (FA) allocated to a neighbor second type terminal based on an uplink transmission signal transmitted from the neighbor second type terminal to a second type base station;

determine an available FA based on the first FA, the available FA being not overlapped with the first FA; and allocate sub-channels associated with one of available FAs not used by the neighbor second type terminal to a first type terminal, allocate, if there does not exist any available FA not used by the neighbor second type terminal, the sub-channels associated with an FA, for which a sum of energies of sub-channels is minimum, to the first type terminal, wherein a sub-channel for downlink transmissions of the neighbor second type terminal are allocated in the first FA in which a sub-channel for uplink transmissions of the neighbor second type terminal are allocated, to determine the available FA, if the neighbor second type terminal is located at the first type base station interference area.

* * * * *